United States Patent [19]
Fullerton

[11] Patent Number: 4,743,906
[45] Date of Patent: May 10, 1988

[54] TIME DOMAIN RADIO TRANSMISSION SYSTEM

[75] Inventor: Larry W. Fullerton, Huntsville, Ala.

[73] Assignee: Charles A. Phillips, Ardmore, Tenn.; a part interest

[21] Appl. No.: 870,177

[22] Filed: Jun. 3, 1986

Related U.S. Application Data

[63] Continuation-in-part of Ser. No. 677,597, Dec. 3, 1984.

[51] Int. Cl.⁴ ............................................. G01S 13/04
[52] U.S. Cl. ...................................... 342/27; 342/21; 375/1; 375/35
[58] Field of Search ............... 342/21, 22, 118, 120, 342/127, 132, 134, 145, 201, 27, 28; 375/1, 35

[56] References Cited

U.S. PATENT DOCUMENTS

| | | | |
|---|---|---|---|
| 3,175,214 | 3/1965 | Ramsay et al. | 342/145 X |
| 3,195,130 | 7/1965 | Adrian | 342/145 |
| 3,423,754 | 1/1969 | Gunn | 342/132 |
| 3,631,351 | 1/1970 | Paine | 342/127 X |
| 3,680,100 | 7/1972 | Woerrlein | 342/145 X |
| 3,806,795 | 4/1974 | Morey | 324/337 |
| 4,241,346 | 12/1980 | Watson | 342/120 X |
| 4,443,799 | 4/1984 | Rubin | 342/201 |
| 4,641,317 | 2/1987 | Fullerton | 375/1 |

OTHER PUBLICATIONS

Skolnik, *Intro. to Radar Systems;* pp. 375-376; (McGraw-Hill, 1980).

Bennett et al., "Time-Domain Electromagnetics and Its Applications," Proceedings of the IEEE, vol. 66, No. 3, Mar. 1978.

Cook, J. C., "Monocycle Radar Pulses As Environmental Probes," Institute of Science and Technology, The University of Michigan.

*Primary Examiner*—Theodore M. Blum
*Assistant Examiner*—Bernarr E. Gregory
*Attorney, Agent, or Firm*—C. A. Phillips

[57] ABSTRACT

A communications system wherein there is employed a signal mixer in which a received signal is multiplied by a template signal, and then the output of the mixer is integrated. By this process, usable signals are obtained which would be otherwise obscured by noise.

19 Claims, 5 Drawing Sheets

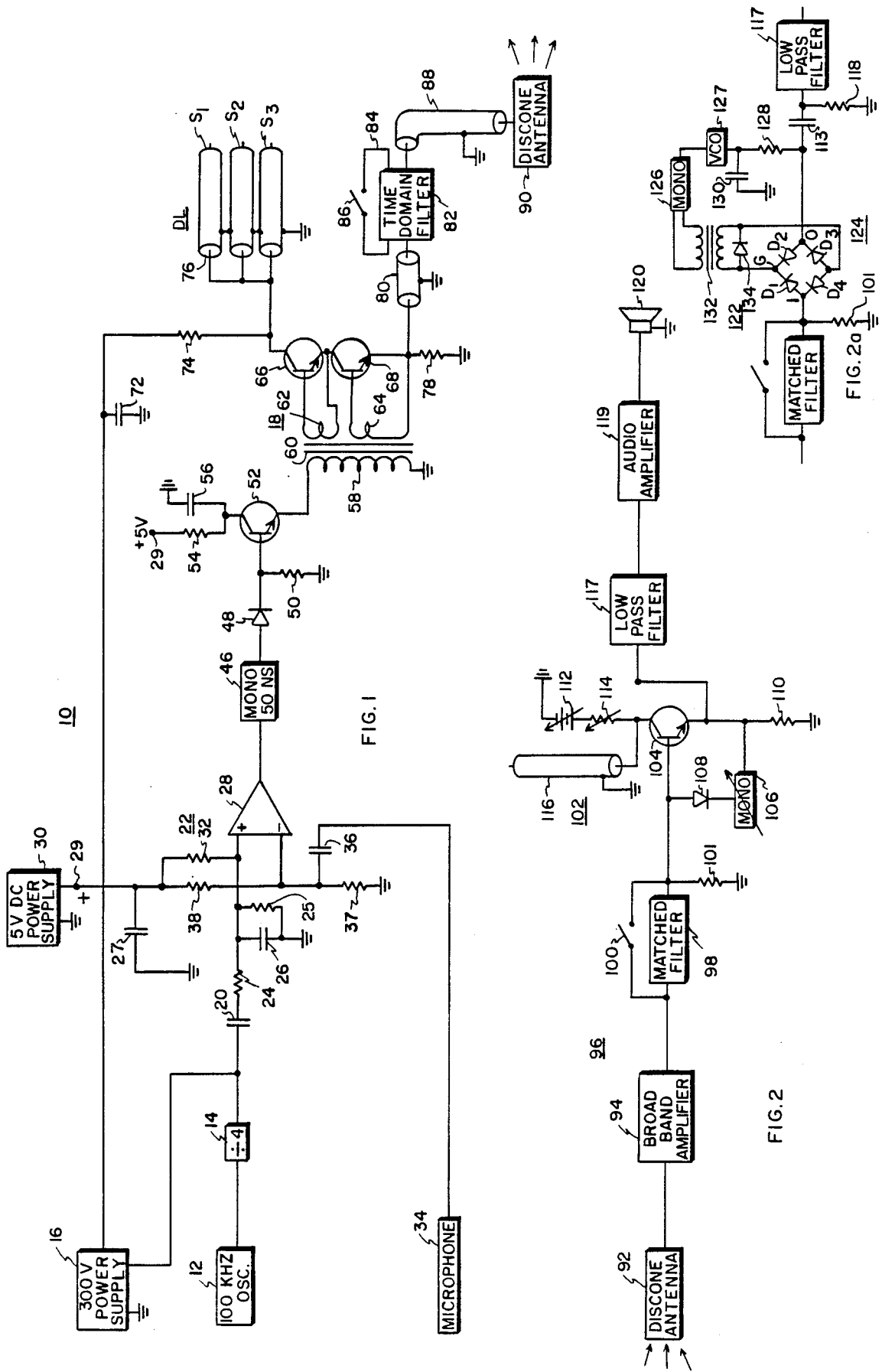

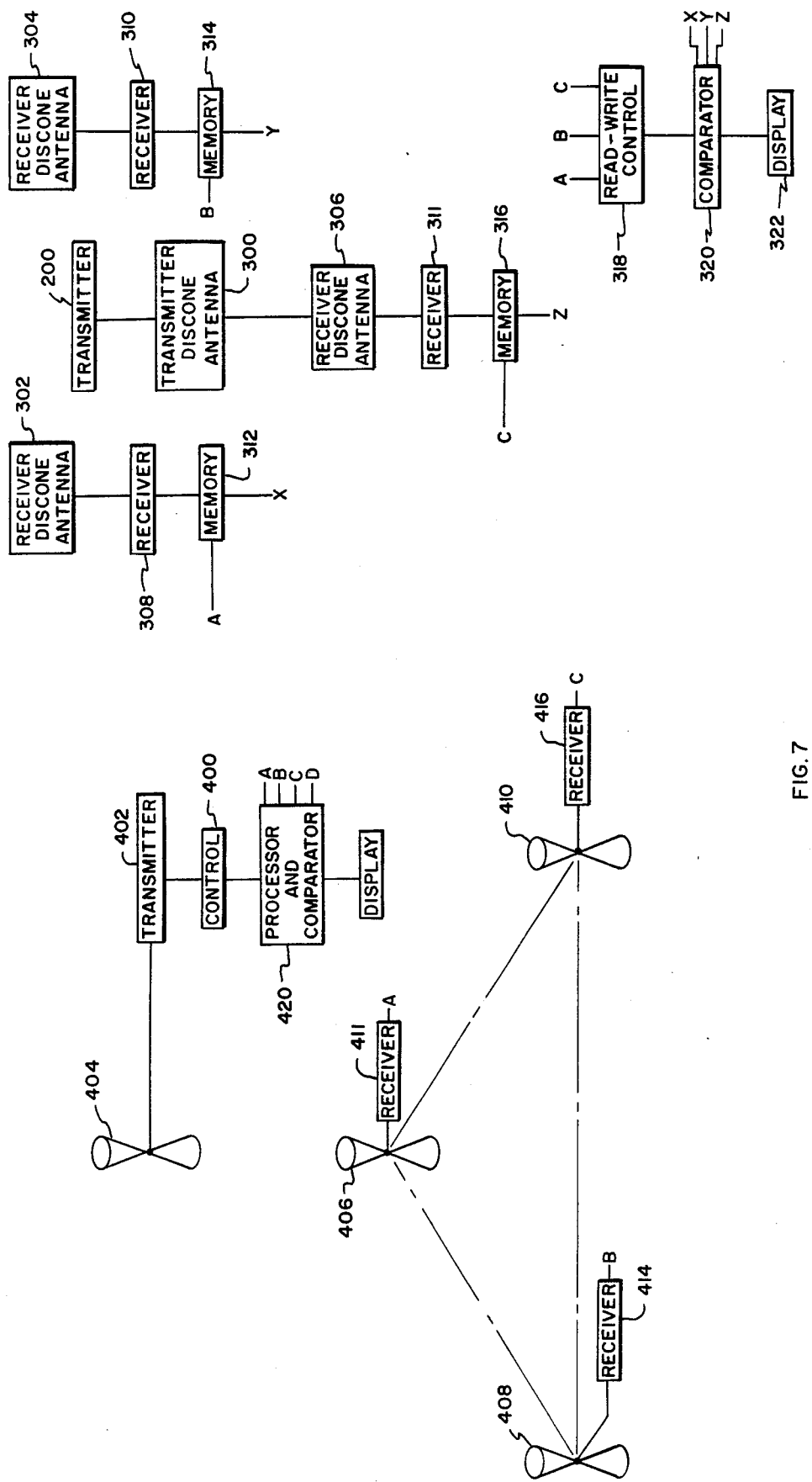

TIME DOMAIN RADIO TRANSMISSION SYSTEM

This is a continuation-in-part of application Ser. No. 06/677,597, filed Dec. 3, 1984, entitled "Spread Spectrum Radio Transmission System."

FIELD OF THE INVENTION

The invention relates generally to radio transmission systems, and particularly to a time domain system wherein spaced single cycles, or near single cycles sometimes referred to as monocycles, of electromagnetic energy are transmitted in space and where discrete frequency signal components are generally below noise level and are thus not discernable by conventional radio receiving equipment.

BACKGROUND OF THE INVENTION

The radio transmission of communications signals, for example, audio signals, is normally effected by one of two methods. In one, referred to as an amplitude modulation system, a sinussoidal radio frequency carrier is modulated in amplitude in terms of the intelligence or communications signal, and when the signal is received at a receiving location, the reverse process, that is, demodulation of the carrier, is effected to recover the communications signal. The other system employs what is termed frequency modulation, and instead of amplitude modulation of the carrier signal, it is frequency modulated. When an FM frequency modulation or FM signal is received, circuitry is employed which performs what is termed discrimination wherein changes in frequency are changed to changes in amplitude in accordance with the original modulation, and thereby a communications signal is recovered. In both systems, there is as a basis a sinusoidal carrier which is assigned and occupies a distinctive frequency band width, or channel, and this channel occupies sprectrum space which cannot be utilized by other transmissions within the range of its employment. At this time, almost every nook and cranny of spectrum space is being utilized, and there is a tremendous need for some method of expanding the availability of communications channels. In consideration of this, it has been suggested that instead of the use of discrete frequency channels for radio communications links, which is the conventional approach, a radio transmission link employing a wider frequency spectrum which may extend over a range of 10 to 100 times the intelligence band width being transmitted, but wherein the energy of any single frequency making up that spectrum be very low, typically below normal noise levels. Thus, it would be obvious that this type of transmission would be essentially non-interfering with other services.

Additionally, and as well expressed in an article entitled "Time Domain Electromagnetics and Its Application," Proceedings of the IEEE, Vol. 66, No. 3, (March 1978), it has been suggested that baseband signals generated from pulses of a short duration, e.g., in the pico second range employed for such applications as baseband radar. Ranges on the order of 5 to 5,000 feet were suggested. This article appeared in 1978, and recent discussions with radar engineers as to subsequent development of baseband radar suggest that little has been achieved, particularly in the development of the widely use medium range field of up to 10 kilometers. The reasons given for the lack of success in this area appear to be signal reception from such systems cannot adequately combat noise. It is to be kept in mind that the signal-to-noise ratio problem is made enormous by the fact that the baseband radar signal received must compete with all of the electromagnetic noise occurring within the entire spectrum of the band of the radar signal, which is, for example, from 100 MHz to 1.5 GHz, or higher. Even where there is no intentional jamming of energy present, there is an enormous amount of electromagnetic energy present in addition to the poor radar signal at the input of a BAR BAseband Radar. On its face, the problem seems rather hopeless, and it is believed that this is about where the problem lies.

SUMMARY OF THE INVENTION

In accordance with this invention, a pulse signal of a fixed or programmed rate is generated, and it is varied or modulated as to the time of occurrence when it is employed as a basis of an intelligence signal. The resultant pulse signals affect the turn-on or turn-off of a fast electronic switch such as an avalanche mode operated semiconductor or spark gap which turns on or off power input to a broadband transmission system. The resultant output, a carrierless signal burst, is coupled to the atmosphere or space and thus transmission. Reception of the transmission is effected by a receiver which is timed selectively to effect detection employing an analog multiplier which multiplies the received signal by a locally generated signal which bears a polarity-time relationship to the transmitted signal. The multiplication produces a correlation signal which rather uniquely corresponds to the actual transmitted signal where the target is normal and planar to the direction of transmission and reception. Thus, even in the presence of an essentially randomly changing voltage from noise, upon which the transmitted signal is typically riding, it has been found that signal recognition over the noise can be achieved despite substantially higher levels of noise than the level of the radar signal. Essentially what happens is that in the absence of a received signal which is not closely in phase from a polarity point of view with the internally generated signal, the output, particularly after integrative processing, will be vastly lower in level than with a correlated signal present. To enhance reception even further, the output of the mixer, or correlator, is sampled at a number of points over its effective length or duration, and it then becomes possible to relate this series of points with a series of anticipated values and a decision as to whether there is a target present can be made in terms of a degree of resemblance between a standard and the waveform bit pattern of the received signal. This process thus is a two-stage one, wherein one would choose a known template, representative, at least time-polaritywise, of a particular type of target for the injection signal. There is then provided a detected signal which will provide target identification with an extremely high probability just from its level. Then, beyond this, by virtue of discrete samplings at selected time points and comparison with what would be expected if a target were present, a still further element of positiveness in resolution is enabled. All in all, it is believed that the present invention solves the greatest inhibition to the satisfactory development of medium and, in fact, long distance radar.

BRIEF DESCRIPTION OF THE DRAWINGS

FIG. 1 is a combination block-schematic diagram of a time domain transmitter.

FIG. 2 is a combination block-schematic diagram of a time domain receiver as contemplated by this invention.

FIG. 2a is a combined block-schematic electrical diagram of an alternate form of synchronous detector to the one shown in FIG. 2.

FIG. 6 is a schematic illustration of a surveillance system as contemplated by the present invention.

FIG. 7 is a schematic illustration of a phased array radar system as contemplated by this invention.

DETAILED DESCRIPTION OF THE DRAWINGS

Figure 3:
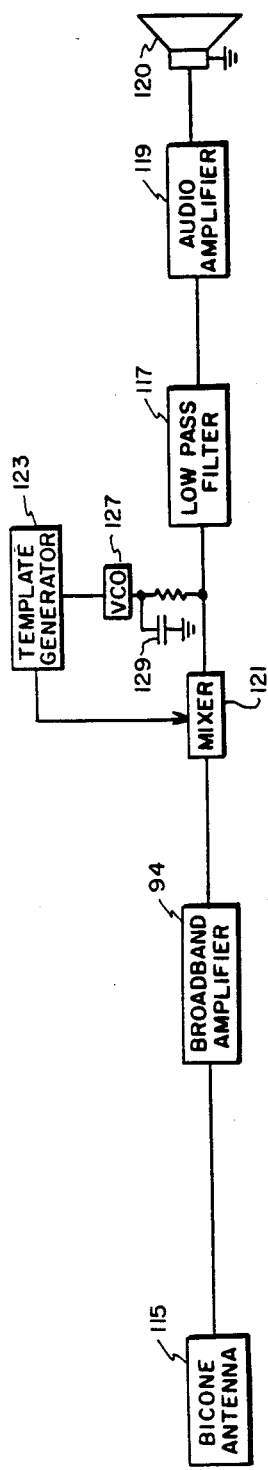
FIG. 3 is an electrical block diagram of an alternate embodiment of a time domain receiver.

Referring to FIG. 1, and initially to transmitter 10, a base frequency of 100 KHz is generated by oscillator 12, typically being a crystal controlled oscillator which includes conventional circuitry for providing as an output square wave pulses at 100 KHz rate. This pulse signal is applied to divide-by-4 divider 14 to provide at its output a square wave 25 KHz, 0–5 volt, signal shown in waveform A of FIG. 4. Further references to waveforms will simply identify them by their letter identity and will not further refer to the figure, which is FIG. 4 in all cases. This output is employed as a general transmission signal and as an input to power supply 16. The latter is regulated, one which supplies a 300-volt D.C. bias on a non-interfering basis for the output stage 18 of transmitter 10, which is also keyed at the 25 KHz rate.

The output of divide-by-4 divider 14 is employed as a signal base and as such is supplied through capacitor 20 to pulse position modulator 22. Pulse position modulator 22 includes in its input an RC circuit consisting of resistor 24 and capacitor 26 which convert the square wave input to an approximately triangular wave as shown in waveform B, it being applied across resistor 25 to the non-inverting input of comparator 28. A selected or reference positive voltage, filtered by capacitor 27, is also applied to the non-inverting input of comparator 28, it being supplied from +5 volt terminal 29 of D.C. bias supply 30 through resistor 32. Accordingly, for example, there would actually appear at the non-inverting input a triangular wave biased upward positively as illustrated by waveform C.

The actual conduction level of comparator 28 is determined by an audio signal input from microphone 34 supplied through capacitor 36, across resistor 37, to the inverting input of comparator 28, as biased from supply 30 through resistor 38 and across resistor 32. The combined audio signal and bias is illustrated in waveform D. By virtue of the thus described input combination, the output of comparator 28 would rise to a positive saturation level when triangular wave signal 40 (waveform E) is of a higher value than modulation signal 42 and drop to a negative saturation level when modulation signal 42 is of a greater value than the triangular wave signal 40. The output signal of comparator 28 is shown in waveform F.

In the present case, we are interested in employing the negative going or trailing edge 44 (waveform F) of the output of comparator 28, and it is to be noted that this trailing edge will vary in its time position as a function of the signal modulation. This trailing edge of the waveform in waveform F triggers "on" mono, or monostable multivibrator, 46 having an "on" time of approximately 50 nanoseconds, and its output is shown in waveform G. For purposes of illustration, while the pertinent leading or trailing edges of related waveforms are properly aligned, pulse widths and spacings (as indicated by break lines, spacings are 40 microseconds) are not related in scale. Thus, the leading edge of pulse waveform G corresponds in time to the trailing edge 44 (waveform F) and its time position within an average time between pulses of waveform G is varied as a function of the input audio modulation signal to comparator 28.

The output of mono 46 is applied through diode 48 across resistor 50 to the base input of NPN transistor 52 operated as a triggering amplifier. It is conventionally biased through resistor 54, e.g., 1.5K ohms, from +5 volt terminal 29 of 5 volt power supply 30 to its collector. Capacitor 56 having an approximate capacitance of 0.1 mf is connected between the collector and ground of transistor 52 to enable full bias potential to appear across the transistor for its brief turn-on interval, 50 nanoseconds. The output of transistor 52 is coupled between its emitter and ground to the primary 58 of trigger transformer 60. Additionally, transistor 52 may drive transformer 60 via an avalanche transistor connected in a common emitter configuration via a collector load resistor. In order to drive transformer 60 with a steep wave front, the avalanche mode operated transistor is ideal. Like secondary windings 62 and 64 of trigger transformer 60 separately supply base-emitter inputs of NPN avalanche, or avalanche mode operated, transistors 66 and 68 of power output stage 18. Although two are shown, one or more than two may be employed when appropriately coupled.

Avalanche mode operated transistors 66 and 68, many type 2N2222 with a metal can, have the characteristic that when they are triggered "on," their resistance goes low (e.g., approximately 30 ohms for each) and stays at this state until collector current drops sufficiently to cut off conduction (at a few microamperes). Certain other transistors, such as a type 2N4401, also display reliable avalanche characteristics. Their collector-emitter circuits are connected in series, and collector bias of +300 volts is applied to them from power supply 16, across filter capacitor 72, and through resistor 74 to one end 76 of parallel connected delay lines DL. While three sections $S_1$–$S_3$ are shown, typically five to ten would be employed. They may be constructed of type RG58 coaxial cable, and each being approximately three inches in length as required to totally effect an approximately 3 nanosecond pulse. As shown, the positive input potential from resistor 74 is connected to the center conductor of each of the delay lines, and the outer conductors are connected to ground. Resistor 74 is on the order of 50K ohms and is adjusted to allow a current flow through transistors 66 and 68 of about 0.2 MA which is a zener current which places both transistors in a near self-triggering state. It has been found that under this condition, the transistors will self-adjust to an avalanche voltage which may be different for the two. Normally, resistor 74 will still be of value which will enable charging of the delay lines DL between pulses. Delay lines DL are charged to 300 volts bias during the period when transistors 66 and 68 are turned off, between input pulses. When the inputs to transistors 66 and 68 are triggered "on" by a triggering pulse they begin to conduct within 0.5 nanoseconds, and by virtue of the low voltage drop across them (when operated in an avalanche mode as they are), about 120 volts appears as a pulse across output resistor 78, e.g., 50 ohms.

Significantly, the turn-on or leading edge of this pulse is effected by the trigger pulse applied to the inputs of transistors 66 and 68, and the trailing edge of this output pulse is determined by the discharge time of delay lines DL. By this technique, and by choice of length and Q of the delay lines, a well-shaped, very short pulse, on the order of 3 nanoseconds and with a peak power of approximately 300 watts, is generated. Following turn-off, delay lines DL are recharged through resistor 74 before the arrival of the next triggering pulse. As will be apparent, power stage 18 is extremely simple and is constructed of quite inexpensive circuit elements. For example, transistors 66 and 68 are available at a cost of approximately $0.12.

The output of power output stage 18 appears across resistor 78 and is supplied through coaxial cable 80 to a time domain shaping filter 82 which would be employed to affix a selected signature to the output as a form of encoding or recognition signal. Alternately, filter 82 may be omitted where such security measures are not deemed necessary; and, as indicative of this, a bypass line 84 including a switch 86 diagrammatically illustrates such omission.

The signal output of filter 82, or directly the output of power stage 18, is supplied through coaxial cable 88 to discone antenna 90, which is an aresonant antenna. This type of antenna relatively uniformly radiates all signals of a frequency above its cut-off frequency, which is a function of size, for example, signals above approximately 50 MHz for a relatively small unit. In any event, antenna 90 radiates a wide spectrum signal, an example being shown in the time domain in waveform H of FIG. 4, essentially a monocycle, this waveform being the composite of the shaping effects of filter 82, if used, and, to an extent, discone antenna 90.

Figure 1A:
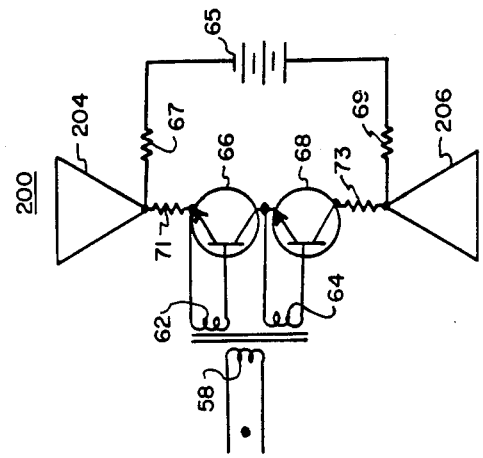
FIG. 1a is a schematic diagram of an alternate form of output stage for the transmitter shown in FIG. 1.

FIG. 1a illustrates an alternate and simplified output stage. As illustrated, biconical antenna 200, as a broadband antenna, is charged by a D.C. source 65 through resistors 67 and 69 to an overall voltage which is the sum of the avalanche voltage of transistors 66 and 68 as discussed above. Resistors 67 and 69 together have a resistance value which will enable transistors 66 and 68 to be biased as described above. Resistors 71 and 73 are of relatively low value and are adjusted to receive energy below the frequency of cut-off of the antenna and also to prevent ringing. In operation, when a pulse is applied to the primary 58 of pulse transformer 60, transistors 66 and 68 are turned on, effectively shorting, through resistors 71 and 73, biconical antenna elements 204 and 206. This action occurs essentially at the speed of light, with the result that a signal, essentially a monocycle or about one and a half cycles as shown in FIG. 4H, is transmitted as described above for the transmitter output system shown in FIG. 1.

The output of discone antenna 90, or bicone antenna, is typically transmitted over a discrete space and would typically be received by a like discone antenna 92 of receiver 96 at a second location. Although transmission effects may distort the waveform some, for purposes of illustration, it will be assumed that the waveform received will be a replica of waveform H. The received signal is amplified by broad band amplifier 94, having a broad band frequency response over the range of the transmitted signal. In instances where a filter 82 is employed in transmitter 10, a reciprocally configured filter 98 would be employed. As illustrative of instances where no matched filter would be employed, there is diagrammatically illustrated a switch 100 connecting the input and output of filter 98, denoting that by closing it, filter 98 would be bypassed. Assuming that no match filter is employed, the output of broad band amplifier as an amplified replica of waveform H is illustrated in waveform I. In either case, it appears across resistor 101.

Signal waveform I is applied to synchronous detector 102. Basically, it has two functional units, avalanche transistor 104 and adjustable mono 106. Mono 106 is driven from an input across emitter-resistor 110, connected between the emitter of avalanche transistor 104 and ground. Avalanche transistor 104 is biased from variable voltage D.C. source 112, e.g., 100 to 130 volts, through variable resistor 114, e.g., 100K to 1M ohms. A delay line 116 is connected between the collector and ground of transistor 104 and provides the effective operating bias for transistor 104, it being charged between conduction periods as will be described.

Assuming now that a charging interval has occurred, avalanche transistor 104 will be turned on, or triggered, by a signal applied to its base from across resistor 101. It will be further assumed that this triggering is enabled by the Q output, waveform J, of mono 106 being high. Upon being triggered, the conduction of avalanche transistor 104 will produce a rising voltage across emitter resistor 110, waveform K, and this voltage will in turn trigger mono 106 to cause its Q output to go low. This in turn causes diode 108 to conduct and thus effectively shorting out the input to avalanche transistor 104, this occurring within 2 to 20 nanoseconds from the positive leading edge of the input signal, waveform I. The conduction period of transistor 104 is precisely set by the charge capacity of delay line 116. With a delay line formed of 12" of RG58 coaxial cable, and with a charging voltage of approximately 110 volts, this period is set, for example, at approximately 2 nanoseconds. One to 25 sections of coaxial cable having lengths of from 0.25" to 300" may be employed, with appropriate variation in on-time.

Mono 106 is adjustable to set a switching time for its Q output to return high at a selected time, following it being a triggered as described. When it does, diode 108 would again be blocked and thus the shorted condition on the base input of avalanche transistor 104 removed, enabling it to be sensitive to an incoming signal. For example, this would occur at time $T_1$ of waveform J. The period of delay before switching by mono 106 is set such that renewed sensitivity for avalanche amplifier 104 occurs at time point $T_1$, just before it is anticipated that a signal of interest will occur. As will be noted, this will be just before the occurrence of a signal pulse of waveform I. Thus, with a repetition rate of 25 KHz for the signal of interest, as described, mono 106 would be set to switch the Q output from low to high after an essentially 40 microsecond, or 40,000 nanosecond, period. Considering that the width of the positive portion of the input pulse is only about 20 nanoseconds, thus, during most of the time, synchronous detector 102 is insensitive. The window of sensitivity is illustrated as existing from time $T_1$ to $T_2$ and is tunable in duration by conventional timing adjustment of mono 106. Typically, it would be first tuned fairly wide to provide a sufficient window for rapid locking onto a signal and then be tuned to provide a narrower window for a maximum compression ratio.

The output signal of avalanche transistor 104, waveform K, is a train of constant width pulses having a leading edge varying as a function of modulation. Thus, we have a form of pulse position modulation present. It appears across emitter-resistor 110, and it is fed from the emitter of transistor 104 to an active type low pass filter 117. Low pass filter 117 translates, demodulates, this thus varying pulse signal to a base band intelligence signal, and this is fed to, and amplified by, audio amplifier 119. Then, assuming a voice transmission as illustrated here, the output of audio amplifier 119 is fed to and reproduced by loud speaker 120. If the intelligence signal were otherwise, appropriate demodulation would be employed to detect the modulation present.

It is to be particularly noted that receiver 96 has two tuning features: sensitivity and window duration. Sensitivity is adjusted by adjustment of variable voltage source 112, and signal "lock on" is effected by tuning of the period of high output state of mono 106 as described. Typically, this period would be adjusted to the minimum necessary to capture the range of excursion of the position modulated signal pulses of interest.

FIG. 3 illustrates an alternate form of detector for receiver 96, it being designated detector 122. In it a form of synchronous signal detection is effected employing ring demodulator 124, formed of four matched diodes $D_1$–$D_4$. In essence, it is operated as a single pole, single throw switch, or simply a gate, with an input appearing across resistor 101 and applied to its input terminal I. Its gated output appears at terminal 0 and is fed through capacitor 113 and across resistor 115 to the input of demodulating, active type, low pass filter 117. Ring demodulator 124 is gated by a pulse PG illustrated in dashed lines in waveform L of FIG. 4 and applied across terminal G. Pulse PG is generated by mono (monostable multivibrator) 126 as controlled by VCO (voltage controlled oscillator) 127. VCO 127 is in turn controlled to effect synchronization with the average rate of the incoming signals shown in solid lines in waveform L. To accomplish this, the output voltage from ring demodulator 124 is fed through resistor 128 and across a (averaging) capacitor 130, connected to the control input of VCO 127. The thus controlled signal frequency output of VCO 127 is fed to the input of mono 126 which then provides as an outut gating pulse PG. This pulse is rectangular as shown and having a selected purse width, typically from 2 to 20 nanoseconds, being selected in terms of the time modulation of the transmitted pulse. It is fed to the primary winding of pulse transformer 132, and the secondary of this transformer is coupled across gate terminals G of ring demodulator 124. Diode 134 is connected across the secondary of transformer 132 and functions to effectively short out the negative transition which would otherwise occur by virtue of the application of the pulse output of mono 126 to transformer 132. In this manner, the gating pulse PG operates to bias all of the diodes of ring demodulator 124 conductive for its duration and thereby gating through the signal input from terminal I to terminal 0. As stated above, this signal input is applied through capacitor 113 and across resistor 115 to the input of low pass filter 117.

Figure 4:
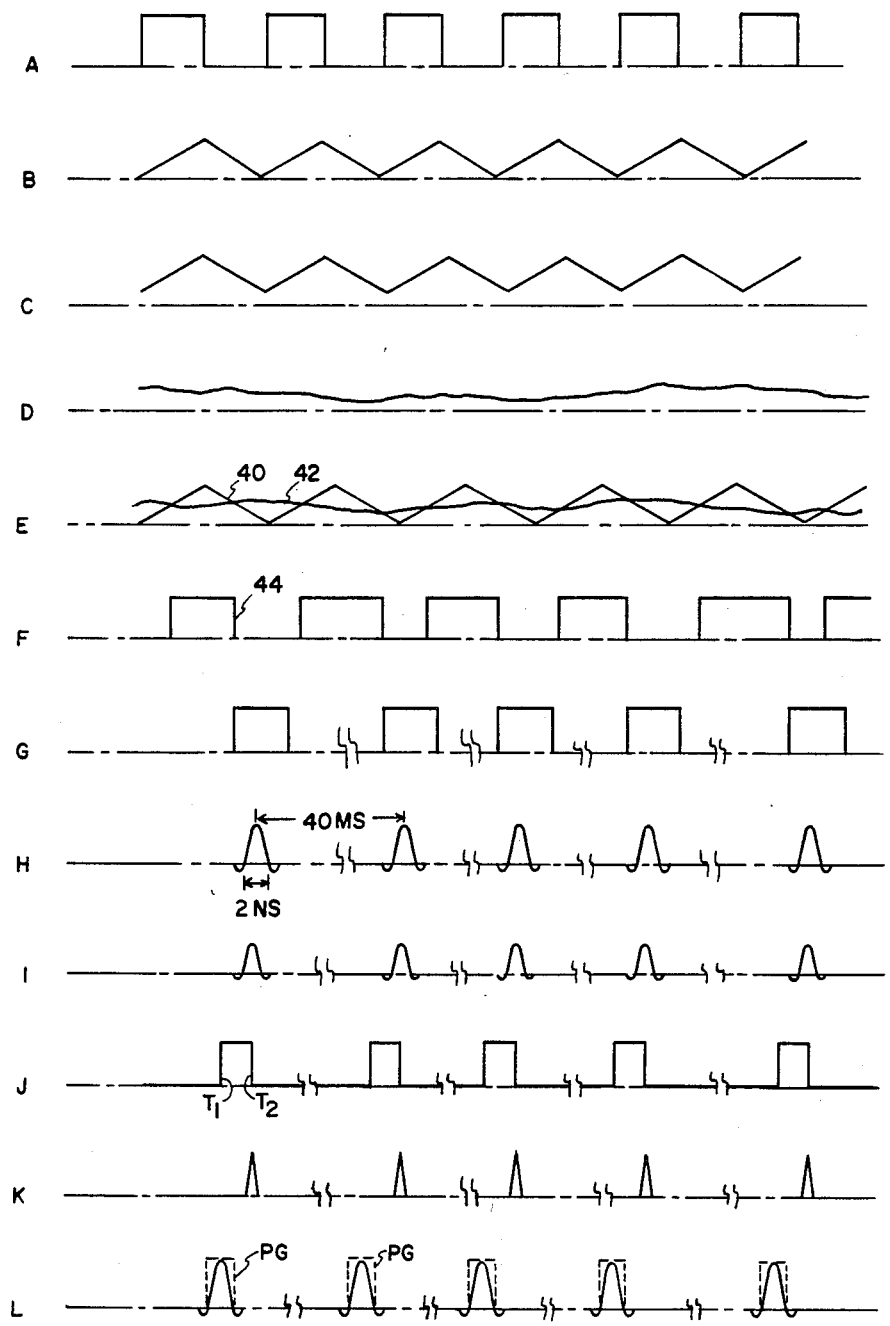
FIG. 4 is a set of electrical waveforms illustrative of aspects of the circuitry shown in FIGS. 1 and 2.

The function of detector 122 is to provide to low pass filter 117 that portion of the input signal shown in waveform L of FIG. 4 appearing within the confines of gating pulse PG. The time position of gating pulse PG is set by the timing of the pulse outputs of VCO 127, and the rate of the output of VCO 127 is determined by the voltage input to VCO 127 as appearing across capacitor 130. Capacitor 130 is chosen to have a time constant which is just below that corresponding to the lowest frequency of modulation to be demodulated. Thus, the output pulse rate of VCO 127 will be such as not to vary the pulse position of gating pulse PG during modulation induced time positions of the input signal (as shown in solid lines in waveform H). As a result, the average value of the signal which is gated through demodulator 124 will vary as a function of the modulation originally applied to the signal. This average value is translated into an amplitude type intelligence signal by passing it through low pass filter 117. It is then amplified, as desired, by audio amplifier 119 and then reproduced by loud speaker 120.

FIG. 3 illustrates an alternate embodiment of the receiver shown in FIG. 2. First, the antenna shown, bicone antenna 115, is employed as a directional antenna. Second, a mixer 117 is in the form of a double balance modulator, and it multiplies the amplified output of broadband amplifier 94 by a replica of the transmitted signal (FIG. 4H) generated by template generator 119 which may be an avalanche transistor. As will be noted, a monostable unit 126 is omitted, and the output of VCO 127 provides an injection voltage to mixer 117. Capacitor 129 and resistor 131 function as a low pass filter to control VCO 127, which is an oscillator which can be varied by one or two cycles by voltage control to effect a phase lock loop.

From the foregoing, it should be appreciated that the applicant has provided a both inexpensive and practical time domain system of communications. It employs the combination of an avalanche mode gated transistor charged from a delay line; and when fed with a modulation induced variable position pulse, provides, as an output, a variable position pulse having a width of one to three nanoseconds. This in turn, of course, enables a large spectrum commencing at about 50 megacycles and extending downward to on the order of 500 megacycles. Thus, with an audio frequence of, say, 5,000 Hz, the energy radiated to transmit this signal is dispersed or spread an almost unbelievable 100,000 times. As a result, interference with a conventional restricted bandwidth signal is essentially eliminated. As an example of the effectiveness of such a system, and employing 20-cent transistors in an avalanche mode, an audio modulated audio leading edge modulated pulse was provided as an output having a peak power of approximately 280 watts. The signal received at a distance of 200 feet had a peak voltage of approximately 1 volt into a 50 ohm load. Actually, the power level necessary to receive has been found to be approximately a few micro-watts, thus the effective range with this power level is considerable. At the same time, a spectrum analyzer at the receiving point failed to reveal any signal present or thus possibility of interference with other services. Actually, in view of the distribution of the spectrum of the transmitted signal, the level present which might interfere with a standard signal, for example, a 5 KHz band width signal, would be on the order of 2.8 micro-watts at the antenna. One way of describing the advantage that this type of transmission has over more conventional ones is to note that power appears in the example during an essentially 3-nanosecond period and appears only every 100,000 nanoseconds. Thus, it has a natural power ratio of 33,000:1. Then, by limiting the listening period for that signal at essentially its pulse width, the receiving circuitry is only concerned with its appearance within a tiny window. Accordingly, the overall signal-to-noise ratio is tremendous. It is to be further appreciated that a vast number of users, employing slightly different repetition rates, may be accommodated and even this may be expanded by discrete patterns of pulse timing. Either analog or digital patterns may be employed which, for example, may effect a dithering of the modulated pulse base, with a like or complementary dithering employed on the receiving end. In fact, with little degrees of sophistication, extremely confidential communications can be achieved even as against a receptor who has general knowledge of the presence of this type transmission. Beyond this, its application to radar and motion detectors is essentially unlimited, enabling detection without delays typically required for signal intergration as often required.

Figure 5:
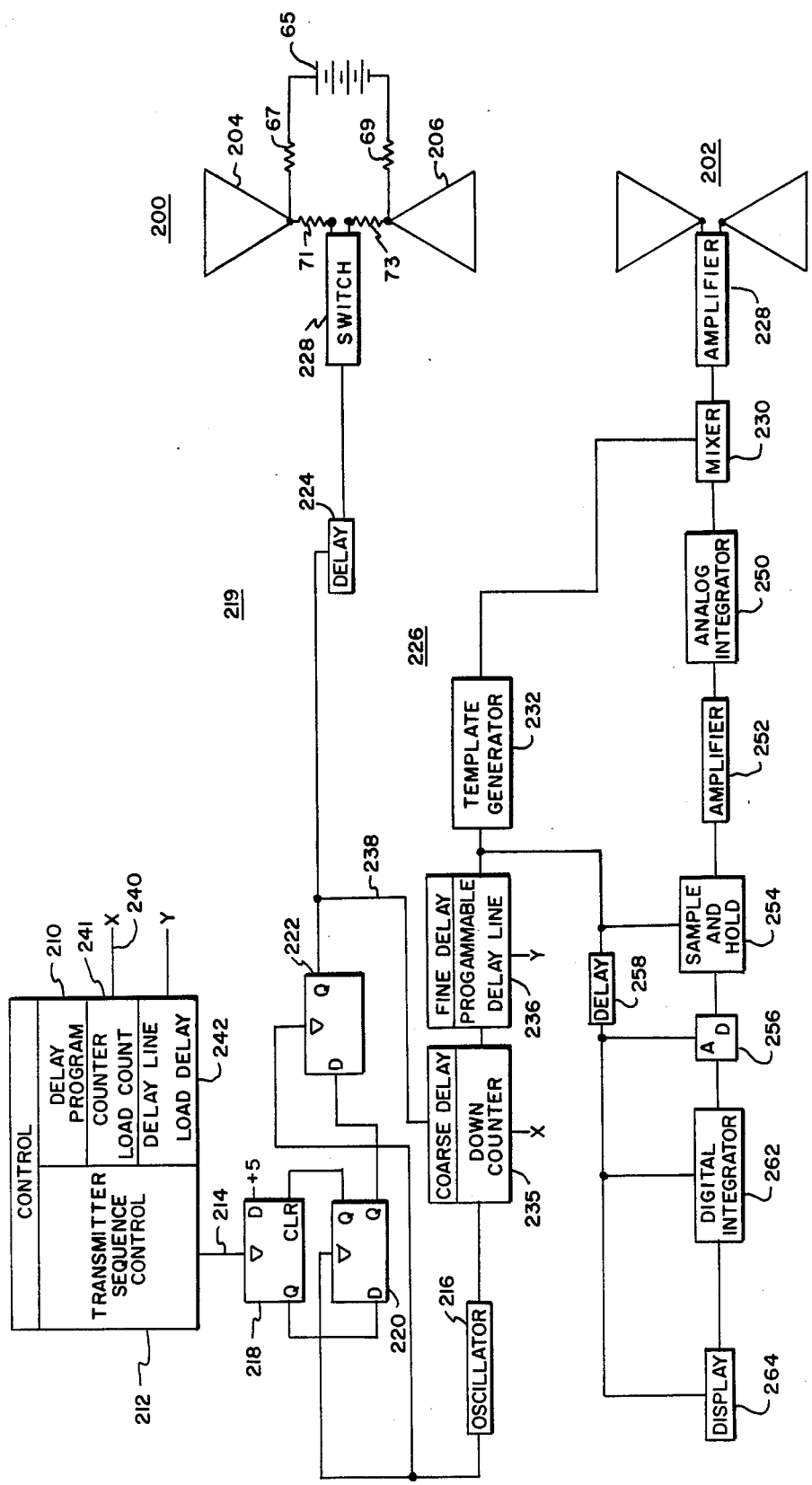
FIG. 5 is an electrical block diagram of a time domain radar system.

FIG. 5 illustrates a radar application of the present invention and particularly to a radar system, or that part of radar system, involved in determining range from transmitting antenna 200, a broadband, bicone antenna, to a like type receiving antenna 202. Of course, appropriate means may also be employed to effect utilization of one antenna for both purposes. In general, signal bursts as illustrated in FIG. 4H (disregarding the time spacing which may vary as selected) is assumed to be transmitted by bicone antenna 200 having antenna elements 204 and 206, and the output stage being in general like that shown in FIG. 1a with switch 208 comprising the combination of the avalanche transistors 66 and 68 and pulse transformer 60.

The transmitter is basically controlled by control 210. It includes a transmit sequence control portion 212 which determines the timing of transmitted signal bursts, which sequence may be random, changing, or at a constant rate, say, for example, 10,000 bursts per second, in which case transmit sequence control 212 would generate and provide as an output a 10,000 Hz pulse output on lead 214. Oscillator 216 is operated at a higher rate, for example, 20 MHz, and the signal output of transmit sequence control 212 is employed to select particular pulse outputs of oscillator 216 to be the actual pulse which is used as a master pulse for controlling both the output of transmitter 218 and the timing of receiver functions as will be further described. In order to unambiguously and repetitively select an operative pulse with low timing uncertainty from oscillator 216, the selection is one and some fraction of an oscillator 216, the selection is one and some fraction of an oscillator pulse interval after an initial signal from control 212. The selection is made via a control sequence employing D-type flip-flops 218, 220, and 222. Thus, the transmit sequence control pulse on lead 214 is applied to the clock input of flip-flop 218. This causes the Q output of flip-flop 218 to transition to a high state, and this is applied to a D input of flip-flop 220. Subsequently, the output of oscillator 216 imposes a rising edge of the clock input of flip-flop 220. At that time, the high level of the D input of this flip-flop is transferred to the Q output. Similarly, the Q output of flip-flop 220 is provided to the D input of flip-flop 222, and the next rising edge of the pulse from oscillator 216 will cause the not Q output to go low and thus initiate the beginning of the transmit-receive cycle.

The not Q output of flip-flop 222 is fed to delay 224 which, in this embodiment, delays this pulse by 200 nanoseconds, and the latter provides an output which triggers switch 228, causing a transmitter burst by bicone antenna 200.

Receiver 226 receives echoes or returns via bicone antenna 202, and this output is amplified by amplifier 228 and fed to mixer 230. Mixer 230 includes a double balanced modulator, and it functions to multiply the signals instantaneously present, say, a signal burst as illustrated by FIG. 4H by a signal which is polarity related and, for example, might be a signal like that of waveform 4H. In our illustration here, we are assuming that we will look at a single period in time for a return following a single output from transmitter 218, and template generator 232 would generate a signal like, for example, waveform 4H and apply it to mixer 230 at a precise time which would be a time which it is possible there would be a signal return for a target. In order to trigger template generator 232 to create a template like waveform 4H at an appropriate time, it is, of course, necessary to effect a delay from a known time related to the transmission of a burst; and in this instance, that signal information is on lead 234. In order to determine the precise time to be examined during a single cycle of operation of the system, encompassing one transmitted pulse, two pulse delay units are employed, course delay down counter 235 and fine programmable delay line 236. Down counter 235 counts down the number of pulse outputs from oscillator 216 which occur subsequent to a control input to it on lead 238. The number of such pulses is programmable in down counter 235 by an output X from load count 241 on lead 240 of control 210, a conventional device wherein a binary count is generated in control 210 which is loaded into down counter 235. As an example, we will assume that it is desired to look at a return which occurs 175 nanoseconds after the transmission of a signal from antenna 200. To accomplish this, we load into down counter 235 the number "7," which means it will count seven of the pulse outputs of oscillator 216, each being spaced at 50 nanoseconds. At the same time, it is to be noted that delay 224 accomplishes a fixed delay of 200 nanoseconds. So there is achieved a 350-nanosecond delay in down counter 234, but subtracting 200 nanoseconds, we will have really an output of down counter 234 occurring 150 nanoseconds after the transmission of a burst by transmitting antenna 200. In order to obtain the precise timing of 175 nanoseconds, an additional delay, or fine delay control, is effected by programmable delay line 236, which is triggered by the output of down counter 235 when its seven count is concluded. It is programmed in a conventional manner by load delay 242 of control 210 on lead Y and, thus in the example described, would have programmed programmable delay line 236 to delay an input pulse provided to it by 25 nanoseconds. In this manner, programmable delay line 236 provides a pulse output to template generator 232, 175 nanoseconds after it is transmitted by bicone transmitting antenna 200. Template generator 232, which may be an avalanche transistor generating a waveform 4H, is then supplied to mixer 230 to be mixed, multiplied, with the amplified received output of receiving bicone antenna 202. The output of mixer 230 is fed to analog integrator 250. Assuming that there is identity in time between the identical waveforms, a D.C. signal level, for example, a positive signal value, will be provided as an output of analog integrator 250. This is amplified by amplifier 252 and supplied to sample and hold unit 254. The output of sample and hold unit 254 is fed to A-D converter 256, which then digitizes the summed values, effecting this after a fixed delay of 40 microseconds provided by delay unit 258 which takes into account the processing time required by sample and hold unit 254. Where desired, a number of transmissions described would be effected in sequence, for example, 10, wherein the same signal transit time of reception would be observed, and any signals occurring during like transmissions would then be integrated in digital integrator 262, and in this way enable recovery of signals from ambient noise. The output of digital integrator 262 would be displayed on display 264, synchronized in time by an appropriate signal from delay line 236 (and delay 256) which would thus enable the time or distance position of a signal return to be displayed in terms of distance from the radar unit.

FIG. 6 illustrates an application of applicant's radar to a surveillance operation which might cover a radius of anywhere from 20 or 30 feet to several thousand feet. In this illustration, it is assembed that there is positioned at a selected central location a transmit bicone antenna, in this case a non-directional, or onmidirectional, antenna 300, and positioned at 120 degree points around it are received bicone antennas 302, 304, and 306. Antenna 300 is powered by a transmitter 200 (FIG. 1a). Assuming that a single signal burst is transmitted from transmit antenna 300, it would be radiated around 360 degrees and into space. At some selected time as discussed above, receivers 308, 310, and 311 would be supplied a template signal as described above to thus in effect cause the receivers to sample a signal echo being received at that precise instant. This process would be repeated for incrementally increasing or decreasing times, and thus there would be stored in the memory's units 312, 314, and 316 signals representative of a range of transit times. Then by selection of a combination of transit times for each of the receivers in terms of triangularizations, it is possible to select stored signals from the memory units representative of a particular location in space. For surveillance purposes, the result of signals derived from one scan and a later occurring scan would be digitally subtracted, and thus where an object at some point within the range of the unit has moved to a new location, there will there be a difference in the scan information. This thus would signal that something may have entered the area. This process in general would be controlled by a read-write control 318 which would control the memory's units 312, 314, and 316 and would control a comparator 320 which would receive selected values X, Y, and Z from memory units 312, 314, and 316 to make the subtraction. Display 322, such as an oscilloscope, may be employed to display the relative position of an object change with respect to a radar location.

FIG. 7 illustrates an application of applicant's invention to a radar system wherein there is one transmitting antenna located in a discrete planar position with respect to the direction of observation, three receiving antennas spaced in a plane parallel to the first plane, and a fourth receiving antenna positioned in a third plane. Thus, radiation from transmitting antenna 404, which is reflected by a target, is received by the four receiving antennas at varying times by virtue of the difference in path length. Because of the unique characteristic of applicant's system in that it can be employed to resolve literally inches, extreme detail can be resolved from the returns. Referring to FIG. 7, control 400 directs a transmission by transmitter 402 which supplies a signal burst transmitting antenna 404. Signal returns are received antennas 406, 408, and 410 located, for example, in a plane generally normal to the direction of view and separate from the plane in which transmit antenna 404 is located. A fourth receiving antenna 412 is located in still a third plane which is normal to the direction of view and thus in a plane separated from the plane in which the other receiving antennas are located. By virtue of this, there is provided means for locating, via triangularization, a target in space, and thus there is derived sufficient signal information to enable three-dimensional information displays. The received signals from receivers 412, 414, 416, and 418 are separately supplied to signal processor and comparator 420, which includes a memory for storing all samples received and in terms of their time of receipt. From this data, one can compute position information by an appropriate comparison as well as target characteristics, such as size and reflectivity.

What is claimed is:

1. A time domain radar system comprising:
   a transmitter comprising:
   signal generating means for generating a series of trigger signals at spaced times,
   a wideband transmitting antenna positioned for transmission into free space,
   a source of D.C. power,
   switching means responsive to said trigger signals and coupled to said source of D.C. potential and coupled to said transmitting antenna for abruptly switching between different states of a potential on said transmitting antenna, and transmitting a series of spaced, A.C., carrierless burst signals, each of which is generally monocyclic, into free space; and
   a radio receiver comprising:
   receiving means for receiving and providing an output responsive to wideband signals received from space between the times of transmission of said A.C. carrierless burst signals from said transmitting antenna,
   detection signal generating means responsive to timing signals for locally generating time spaced local signals, each local signal including a single polarity up to the duration of one polarity of a said transmitted monocyclic burst signal as received,
   timing means responsive to the times of transmissions of said series of said burst signals for generating, as a set, successive said timing signals and coupling them to said detection signal generating means, each said timing signal of a set occurring at a selected like time after the transmission of a said burst signal, wherein a said selected time is representative of the transit time from said transmitting antenna to a target at a selected distance and back to said receiving means,
   output signal mixing and integration means responsive to a said output from said receiving means and a said local burst signal for providing an output signal which is a function signal from mixing a said output of said receiving means and a local burst signal and integrating this function signal for the discrete period of said local signal, and
   integration means responsive to a successive set of output signals from said signal mixing and integration means responsive to a series of transmissions from said transmitting antenna, each of said last-named output signals being for an identical time of transmitted burst signal travel, for providing an integrated signal, said integrated signal being indicative of the presence of signals having been reflected from a target at a selected distance.

2. A system as set forth in claim 1 wherein said timing means includes means for selectively delaying the production of timing signals of a discrete said set of successive said timing signals, whereby sensitivity of said radio receiver for different target ranges may be selected.

3. A system as set forth in claim 2 wherein said timing means is responsive to said signal generating means.

4. A system as set forth in claim 1 wherein said integration means includes means for sampling discrete output signals from said mixing and integration means and integrating the discrete samples.

5. A system as set forth in claim 4 wherein said integration means includes:
  an analog-to-digital converter responsive to said output signals of said mixing and integration means for providing digital signal values of successive said output signals; and
  digital integration means for digitally integrating said digital signal values and providing said integrated signal.

6. A system as set forth in claim 1 wherein said signal generating means includes means for providing said trigger signals at varyingly spaced times.

7. A system as set forth in claim 1 wherein said switching means is positioned generally adjacent said transmitting antenna.

8. A system as set forth in claim 7 wherein said switching means includes an impedance coupled in circuit with said transmitting antenna and switching means.

9. A system as set forth in claim 8 wherein said impedance is electrical resistance.

10. A system as set forth in claim 9 wherein said transmitting antenna comprises two elements, and said switching means includes means in series with said electrical resistance and said two elements for discharging said elements.

11. A time domain radar system comprising:
  a transmitter comprising:
    control means for generating a first series of signals,
    oscillator means for generating a second series of signals at a higher rate than said first series,
    signal means responsive to said first and second series of signals for providing as an output a sequence of discrete signals of said second series of signals which are related to signals of said first series of signals, and said sequence of discrete signals provide trigger signals at spaced times,
  a wideband transmitting antenna positioned for transmission into free space,
  a source of D.C. power,
  switching means responsive to said trigger signals and coupled to said source of D.C. potential and coupled to said transmitting antenna for abruptly switching between different states of a potential on said transmitting antenna, and transmitting a series of spaced, A.C., carrierless burst signals, each of which is generally monocyclic, into free space; and
  a radio receiver comprising:
    receiving means for receiving and providing an output responsive to signals received from space between the times of transmission of said A.C. carrierless burst signals from said transmitting antenna,
    detection signal generating means responsive to timing signals for locally generating time spaced local signals, each local signal including a single polarity up to the period of one polarity of a said transmitted monocyclic burst signal as received,
    timing means responsive to said sequence of discrete signals from said signal means for generating as a set, successive said timing signals and coupling them to said detection signal generating means, each said timing signal of a set occurring at a selected like time after the transmission of a said burst signal, wherein a said selected time is representative of the transit time from said transmitting antenna to a target at a selected distance and back to said receiving means,
    output signal mixing and integration means responsive to a said output from said receiving means and a said local burst signal for providing an output signal which is a function signal from mixing a said output and said receiving means and a local burst signal and integrating this function signal for the discrete period of said local signal, and
    integration means responsive to a successive set of output signals from said signal mixing and integration means and the occurrence of a series of transmissions from said transmitting antenna, each of said last-named output signals being for an identical time of transmitted burst signal travel, for providing an integrated signal, said integrated signal being indicative of the presence or absence of signals having been reflected from a target at a selected distance.

12. A time domain radar system as set forth in claim 11 wherein said signal means comprises means for effecting as an output signal of said signals of said last-named means the next signal from said oscillator means following a said signal of said first series of signals from said control means.

13. A system as set forth in claim 12 wherein said timing means includes means for selectively delaying the production of timing signals of a discrete said set of successive said timing signals, whereby sensitivity of said radio receiver for different target ranges may be selected.

14. A system as set forth in claim 12 wherein said integration means includes means for sampling discrete output signals from said mixing and integration means and integrating the discrete samples.

15. A system as set forth in claim 14 wherein said integration means includes:
  an analog-to-digital converter responsive to said output signals of said mixing and integration means for providing digital signal values of successive said output signals; and
  digital integration means for digitally integrating said digital signal values and providing said integrated signal.

16. A system as set forth in claim 11 wherein said switching means is positioned generally adjacent said transmitting antenna.

17. A system as set forth in claim 16 wherein said switching means includes an impedance coupled in circuit with said transmitting antenna and switching means.

18. A system as set forth in claim 17 wherein said impedance is electrical resistance.

19. A system as set forth in claim 18 wherein said transmitting antenna comprises two elements, and said switching means includes means in series with said electrical resistance and said two elements for discharging power between said elements.

* * * * *